United States Patent

[11] 3,592,970

[72] Inventors Ilio Cappetti;
Giovanni Perucca, both of Turin, Italy
[21] Appl. No. 742,295
[22] Filed July 3, 1968
[45] Patented July 13, 1971
[73] Assignee CSELT Centro Studi e Laboratori Telecommunicazioni S.p.A. Turin, Italy

[54] TIME DIVISION SELF-CORRECTING SWITCHING SYSTEM
9 Claims, 8 Drawing Figs.

[52] U.S. Cl. .......... 179/18 J, 179/18 FC
[51] Int. Cl. .......... H04q 11/04
[50] Field of Search .......... 179/18.9, 15, 18.3 C

[56] References Cited

UNITED STATES PATENTS 3,258,539 6/1966 Mansuetto et al. .......... 179/18 (.9)
3,166,734 1/1965 Helfrich .......... 179/15 (SIG)
3,496,301 2/1970 Kaenel .......... 179/18 (.3 C) X

*Primary Examiner*—Kathleen H. Claffy
*Assistant Examiner*—Thomas W. Brown
*Attorney*—Rauber & Lazar ABSTRACT: A semielectronic line concentrator comprising electromechanical interconnection components and electronic control supervisory and control logic circuits. The concentrator adopts the principle of time division under control of a base frequency which is the highest frequency at which two successive operations on a plurality of stations may be performed. A second-order cycle whose frequency is a submultiple of the base frequency is used in conjunction with the base frequency. Furthermore, the system principle is arranged to be extended by the use of a third-or-more order cycle. There are control circuits responsive to these order cycles to correct automatically for errors in connections owing to noise or unexplained malfunctions.

INVENTORS
ILIO CAPPETTI
GIOVANNI PERUCCA
BY
Rauber & Lazar
ATTORNEYS

INVENTORS
ILIO CAPPETTI
GIOVANNI PERUCCA
BY
Rauber & Lazar
ATTORNEYS

INVENTORS
ILIO CAPPETTI
GIOVANNI PERUCCA
BY
Rauber & Lazar
ATTORNEYS

INVENTORS
ILIO CAPPETTI
GIOVANNI PERUCCA
BY
Rauber & Lazar
ATTORNEYS

INVENTORS
ILIO CAPPETTI
GIOVANNI PERUCCA
BY
Rauber & Lazar
ATTORNEYS

TIME DIVISION SELF-CORRECTING SWITCHING SYSTEM

BACKGROUND OF THE INVENTION

1. Field of the Invention

This invention relates to a semielectronic line concentrator, that adopts the time division principle for space division connecting networks, with a self-checking logical organization called correlated cycles.

2. Description of the Prior Art

In the field of telephony it is known to use the space division principle for connecting networks and the time division principle for control and logic circuits. In such systems, electromechanical components are used for interconnection functions and the supervisory and control logical functions are carried out by electronic circuits. Such systems may be termed "-semi-electronic" switching systems. By such an arrangement there is a particular advantage in making interconnection with existing switching systems.

However, certain difficulties arise because the components usually have different operating characteristics such, as, for example, relays as compared to semiconductor devices. An outstanding disadvantage in such a heterogeneous component mixture is noise that is produced due to the interconnection of the electronic and electromechanical devices. In the electromechanical devices the noise is produced particularly by the generation of voltage spikes due to the breaking of circuits with inducuve loads, which voltages are sensed or detected through capacitive or inductive coupling by the electronic devices, the operation of which may be thereby seriously compromised.

The need for interconnecting new systems with existing electromechanical systems, which systems it is noted are the main source of noise, increases the problem for each application. It is clear that provision must be made to overcome such problems.

As is known in the art, the noise sensitivity of a common electronic logical network is substantially much greater than that of the corresponding network consisting of relays.

In general, there are two methods known to reduce or prevent the harmful effect of noise. First, means are used to prevent noise reaching the electronic components, and, second, means are utilized for increasing the insensitivity to noise of the electronic components.

The usual solution of the first method is the use of separated bays on which the equipment is mounted and of shielding the wiring and the use of low characteristic impedance conductors.

An illustration of the second method is the use of proper "interface" circuits that stop noises in all input or output points of the electronic section of the system. Such circuits generally match the characteristic impedance of the electronic devices to that of the electromechanical devices, such devices and components comprising amplifiers, wave shapers, filters, integrating circuit, threshold circuits and the like.

Nevertheless, extensive use of such solutions is not always possible, especially for small switching systems such as, Private Automatic Branch Exchange (PABX) line connectors, where the space required decreases the shielding and physical separation possibilities and where, furthermore, because of the direct dependence on the main exchange, usually made up of electromechanical components, the ratio between the number of connections causing noise and that of control devices is such that the cost of fully efficient so-called "interface" elements would affect in an uneconomical way the total cost of the electronic devices. In such situations it is known and found to be most suitable to integrate the first type solution of noise problems with those of the second type in order to permit the optimum operation of the electronic circuits even in the presence of noises. Such an integration is achieved with respect to the individual components of the electronic circuits or in respect of the general logical organization itself.

Because of the increasingly extensive use of electronic logical circuits with prefabricated elements, and more particularly of the integrated circuit type, the designers' possibilities to cure or minimize noise within or in a single circuit or component decreases. As a consequence of this great difficulty there is a great interest in the development of particular logical organizations that permit a constant self-correction without causing excessive circuit complications.

Heretofore attempts have been made to develop such systems but there remains much to be done.

It is a general object of this invention to provide a self-correcting logical organization, particularly useful for small semielectronic switching systems. It is a further object of the invention, particularly, to arrange such systems for use as telephonic line concentrators.

SUMMARY OF THE INVENTION

According to one form of the invention there is provided a line concentrator useful in telephonic switching systems that is based on the symmetry of the electromechanical switching networks used for the subscriber and exchange switching units. The line concentrator provides continuous and contemporary supervision of the operation states of the switching network and as such allows for immediate check and automatic correction of possible wrong operations.

The main characteristic of the logical organization according to the invention of the application, even for space division connection network control, of the time division principle used in a particular way which may be termed the "correlated cycles organization" (sometimes herein referred to as "C-CO"). According to the invention the use of this organization provides for a continuous self-correction of all possible erroneous operations.

The time division principle in switching systems is well known. In brief, time slots are allotted to a great number of subscribers and related devices whereby they are each distinguished in time. In order to make the appropriate connections the central office equipment effects this so that each operation is performed in serial fashion, that is, one-at-a-time. Such an organization may be represented by a central (rotating radial) vector, which indicates the relative phase of each time-sequenced operation and its direction of rotation and the angular frequency of the vector defines the operating conditions under which an entire operational cycle is performed. Generally, the highest rotation or cyclic frequency at which two successive operations may be performed on the same device or subscriber is determined by these parameters.

This time division principle is developed according to the invention in association with one or more lower frequency second-order cycles, correlated to the base cycle. The second-order cycles make a step after each basic cycle of operation. Accordingly the angular frequency of the second-order cycle is a division by the factor of N in respect of the base cycle, where N is the second-order cycle step number.

This principle can still be further extended by establishing one or more third-order cycles or even fourth-order, fifth-order, etc., cycles related to the basic frequency by a factor N′, N″, N‴, etc., whereby a complex structure of simplified use is produced.

When such an arrangement is the same in the two concentrator units, there is provided thereby an extremely flexible structure which may be termed, as above indicated, a "correlated cycles organization." A simple choice of base cycle, second-order cycle, third-order, etc., step numbers provides different angular frequencies developed from a single fundamental angular frequency.

In addition, the interdependence among the different cycles, based on their selected temporary correlation brings remarkable simplification of the synchronization of the whole system, even in the presence of usually harmful or otherwise intolerable noise.

According to the invention the line concentrator uses a cross-point matrix either in the exchange unit or in the subscriber unit. The matrix control circuit has a clock generating pulses, that is, "steps," at a fundamental rate which controls a chain of cyclic counters. The cyclic counter positions are decoded in each unit and generate signals controlling the various operations of the system. Such signals are transmitted to the respective other switching unit through an auxiliary transmission system wherein concomitant operations take place. The clock and the counter chain of the two units, that is, the exchange and the subscriber unit, are synchronized by means of signals exchanged also through the auxiliary transmission system. Thus, when one unit receives a control signal from the other unit, it gets data concerning all the operations needed from the position of its cyclical counter. As calls may be originated either from the exchange unit or from the subscriber unit and, therefore, connection control signals may arise from both units, two alternate phases are needed.

During the first phase connection, control signals are sent from the central (exchange) unit to the subscriber unit, while during the second phase, the control signals are transmitted in the opposite direction. Accordingly only a single connecting line is needed for the auxiliary transmission system.

The cyclical counter chain consists of a step ring counter directly controlled by the clock, by a cycle ring counter controlled by each cycle of the step counter, and by a second-order cycle ring counter, controlled by each cycle of the cycle counter. Cyclical counter chains are identical in both the subscriber and exchange units except that the two cycle counters in each, which count only by two, are constantly out of phase. These counters distinguish between a scanning cycle during which calls of subscriber unit are examined and distribution cycle in which calls of the exchange unit are satisfied.

The step counter, through a decoder, allots in each counting cycle or base cycle, a prefixed and constant time slot to each subscriber and to each operation concerning link release, the step counter also provides synchronization and control.

The second-order cycle counter singles out in sequence each link which will be examined for a period corresponding to two base cycles.

During the scanning cycle, signals from the decoder of the step counter reach, in sequence, a scanner distributor circuit, provided with gate circuits which, in sequence, connect the wires originating the call signals of the subscribers to be connected to the control circuits of the corresponding matrix rows.

If there is a call signal on a wire it will be sent to the corresponding row control circuit and also to a circuit controlling links equipped with gate circuits. The gate circuits are controlled by signals coming from the decoder of the second-order cycle counter, and the gate circuits send the signal to the circuit control matrix column corresponding to the link identified by the second-order cycle counter, provided the link is free (idle) for operation.

During the distribution cycle the sequential activity of the gates of the scanner distributor circuit causes, in sequence, the connection of the receiver of the auxiliary transmission system to all of the row control circuits.

The reception of a call signal from the subscriber unit activates the control circuit in the matrix of the local (subscriber) matrix reached by the call signal. The call signal from the scanner distributor circuit is applied to the link control circuit for evaluation during the scanning cycle.

The relay at the cross-point of the activated row and column is operated and is held by a holding circuit controlled by the column control circuit and transmits a signal to the gate circuit of its own column to inhibit any further call signals.

At the beginning of each scanning or distributing cycle the availability of the link corresponding to that cycle is examined by means of a check-signal originated by the step counter and related decoder. The check-signal reaches the link control circuit in a manner similar to any call signal and tests to determine the state of the gate circuit related to the link as being either open or closed. The signal from the gate, when it is open, stores a signal in the memory element indicating that the link under test is free. As a consequence, the memory element transmits an activating signal for the scanner distributor circuit which would otherwise be inhibited.

The stored signal is erased at the start of the next succeeding cycle before the transmission of the subsequent check pulse, or in the alternative, the signal is erased when a call signal appears in the output from the scanner distributor circuit. The condition or state of the connections of the various links is continuously checked by one of the two units in order to determine when a link is released upon completion of use of the subscriber using them by hanging up, or when there are wrong connecting operations. It is preferable to use the exchange unit for this connection condition or state check since the only function performed by the subscriber unit is the execution or generation of release instructions.

In the exchange unit, data on the condition of the connections are sent by means of separate and distinct wires for each link to a link-supervision and release circuit. When a subscriber terminates the call by hanging up the receiver, the release signal appears on the wire assigned to the link that the subscriber has just used. This release signal is examined in the link-supervision and release circuit when the second-order cycle counter singles out that link during a control time slot originated by the step counter.

All the release signals are sent during the control time slot to a guard circuit, that is, to the input of a delay element such as a one-shot multivibrator, and, simultaneously, to the input of an AND gate circuit. After the guard circuit, the signal is sent to the input of a redundancy filter wherein a release instruction for the holding circuit corresponding to the link under test is generated but only after counting a fixed number (*N*of release signals.

The delay element inhibits the passage through the input gate circuit to the redundancy filter of any eventual release signal that may be originated by other links.

The release signals for the link under test are also transmitted to the subscriber unit which also equipped with an identical redundancy filter, and in a similar manner the release instructions are transmitted to the holding circuit. Upon transmission of the release instruction for the local matrix in the exchange unit, the supervision and release circuit are then ready to process release signals coming from another link.

The check signals determining the state of the links in the subscriber unit are passed from the subscriber unit to the exchange unit to indicate the availability of the associated links. These signals arrive at a first input of a reference circuit, whereas the check signals coming from the exchange link control circuit, during the link availability control step, arrive at a second input of the same reference circuit. This reference circuit compares the signals appearing on the first and second inputs and each time they differ, sends a release signal for the guard circuit. This release signal is processed in a similar manner as the other signals just discussed.

A more detailed description of one embodiment of the invention will now be described in conjunction with the following drawings.

DESCRIPTION OF A PREFERRED EMBODIMENT

Figure 1:
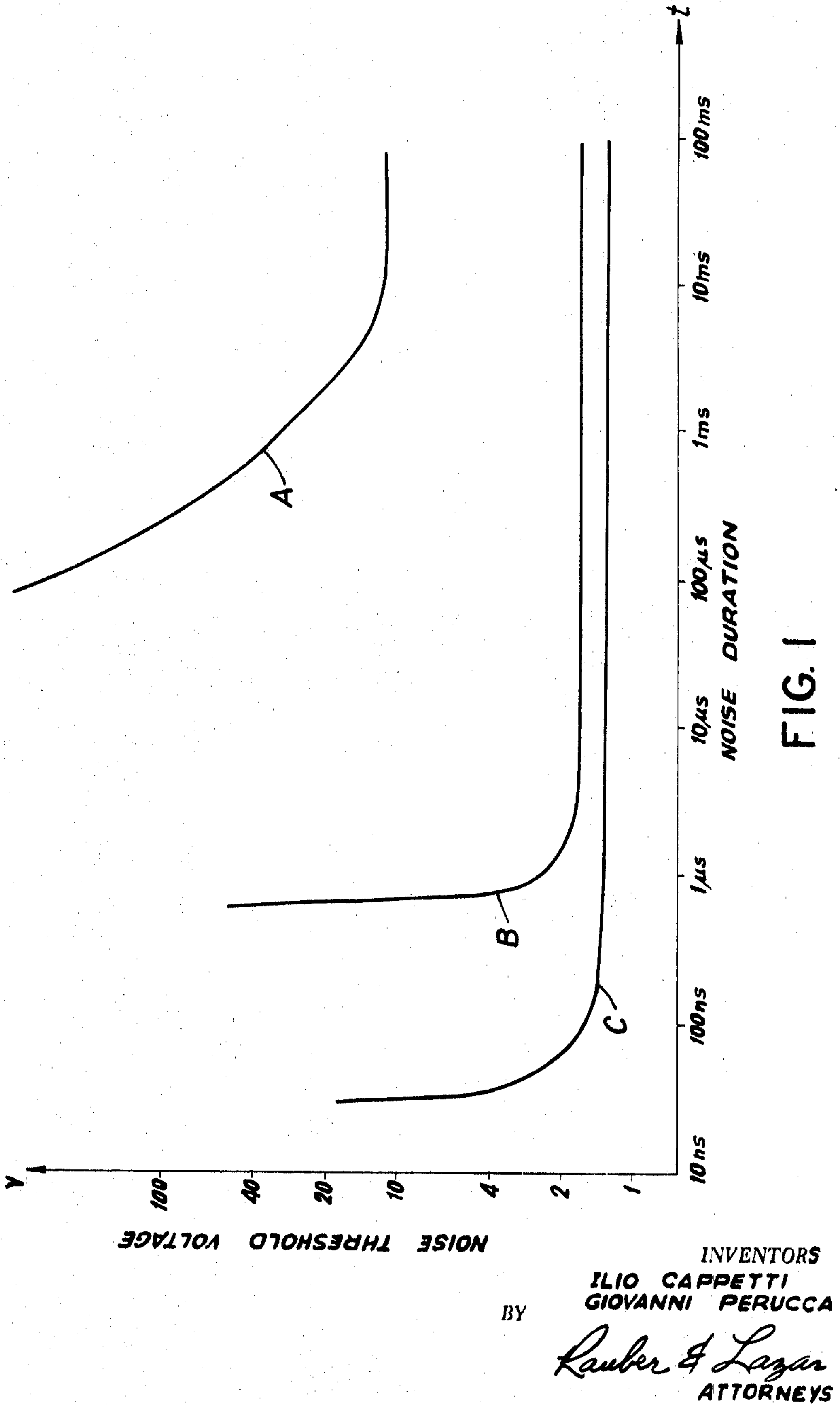
FIG. 1 is a graph of the threshold of noise as a function of the duration of the noise as a result of a signal applied to a logic circuit input that is propagated in the link of the next circuit.

Referring to FIG. 1, there is shown several curves plotted against the ordinate for the noise threshold voltage V and against the abscissa for the noise duration as a function of time. Curve A indicates the noise of fast miniaturized relays. Curve B indicates the noise of an electronic circuit having discrete components such as diode-transistors in logical array. Curve C illustrated the noise in an integrated logic circuit, such as a modified DTL series 830. These curves, as will be apparent to those skilled in the art, indicate the noise threshold, that is, the minimum noise voltage as a function of its duration which when applied to the logic circuit input propagates into the chain of the next circuit.

Figure 2A:
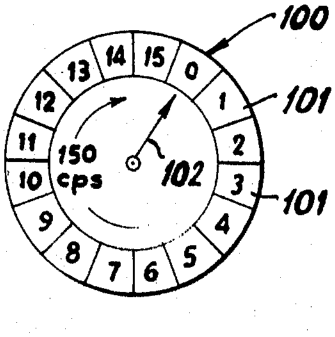
FIG. 2A is a schematic diagram representing the time division principle.

FIG. 2*a* shows essentially a time division organization wherein ring 100 is provided with sectors 101 each of which represents time slots allotted to different devices. The central vector 102 indicates the phase which conventionally is established as the initial phase.

Figure 2B:
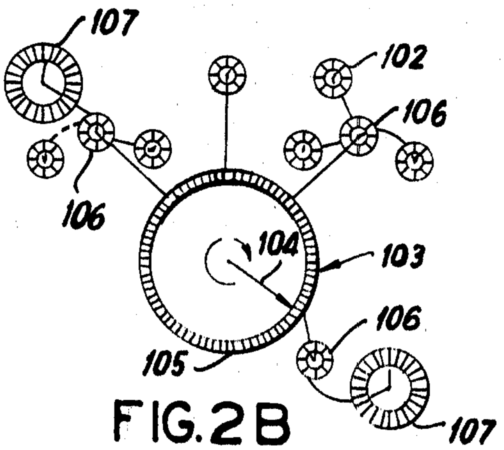
FIG. 2B is a schematic diagram illustrating the correlated cycle principle based on a time division operation.

FIG. 2*b* illustrates the correlated cycles principle utilizing as a starting point the time division organization shown in FIG. 2*a*. A ring 103 with its vector 104 and sectors 105 are schematically shown connected to several lower frequency second-order cycles 106 which in turn are connected to third-order cycles 107. Ring 103, vector 104 and sectors 105 correspond to ring 100, vector 102 and sectors 101.

According to the correlated cycles principle, there is associated, in the same manner for the two concentrator units, one or more such cycles correlated to the base cycle since they make a step after each whole base cycle.

As was stated above, the "correlated cycle organization" (CCO) is extremely flexible since the choice of base cycle and second-order cycle step number provides different angular frequencies produced from a single fundamental angular frequency and thereby makes provision to fit the phase number and their frequency to system needs. In addition, interdependence between the different cycles base on their temporary correlation brings remarkable simplification of synchronism for the system, especially when the synchronism is necessary in the presence of noise. It will thus be appreciated, in general, that as a consequence the described logical organization is very suitable for the transmission, through particularly noise channels, all data which must be always brought up-to-date.

Accordingly it will be appreciated that these principles are applicable for telemetering between artificial satellites and the earth.

The correlated cycles logical organization can be useful when applied to small peripheral switching systems, especially if such use is to be used not only with data transmission, but also to the operation and control of the different switching operations. In this way the all-line concentrator logical section operates according to the correlated cycles principle. More specifically, the different switching and control operations are performed during the same time slots allotted for singling them out in transmission, thereby eliminating the need for a decoder in the reception-transmission circuit.

In this manner there is obtained a true integration of transmission and control devices which is not concerned with speech channels. Accordingly the advantages offered by semielectronic switching are not affected.

Furthermore, space-division-switching electromechanical networks of the subscriber unit and of the exchange unit constitute the reference, which is not affected by noise and upon which the whole self-correcting system is based. In fact, it will be noted that because of the possibility of a cyclical control of many signals offered by the CCO, simultaneous supervision of the operation state of the exchange and subscriber unit by means of the continuous comparison in the time between such states, to have an immediate check and automatic correction of eventual wrong operation.

It will be appreciated that there are these advantages of such organizations, namely great flexibility, ease of synchronization and insensitivity to noise. There still remains the advantage of circuit number reduction due to centralization that is the well known characteristic of all time division systems. Nevertheless, a limitation of such an organization or arrangement is the relatively small capacity of the switching system met, as data transmission speed is limited by the transmission band of the telephone channel.

Furthermore, however, the organization system according to the invention is more efficient and has more possibilities of use owing to the self-correction, time and space symmetries, that are embodied in the subscriber and exchange units, as will be more fully described hereinafter.

Figure 3:
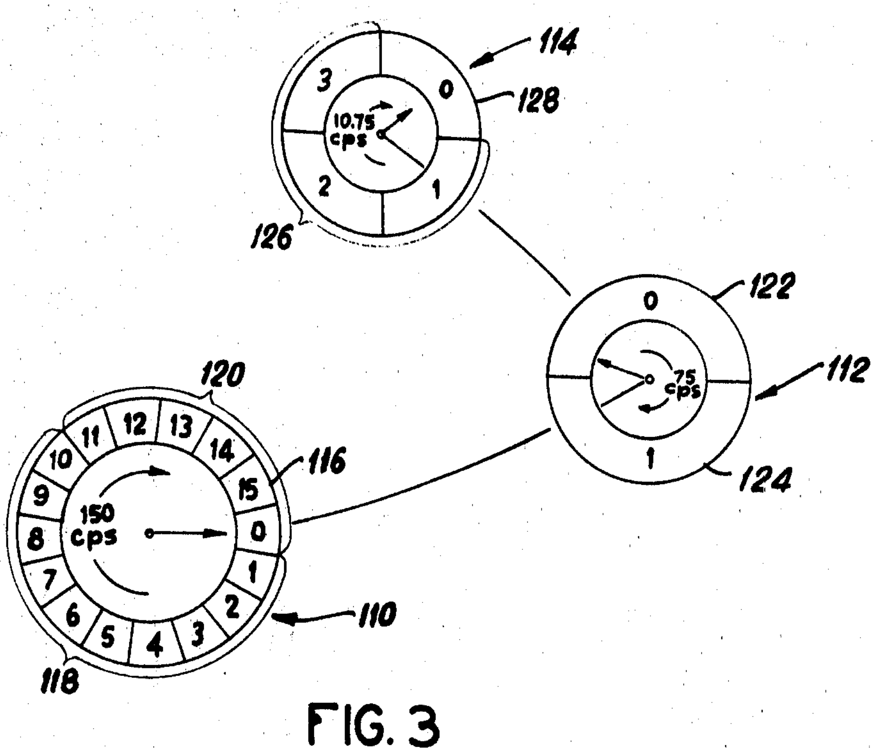
FIG. 3 is a logical diagram of a semielectronic line concentrator.

Referring now to FIG. 3, there is shown in schematic form an example of a semielectronic line concentrator logical diagram providing, for illustrative purposes only, for ten subscribers and a capacity of three links based on the time division correlated cycles principle. This organization consists of a base cycle 110, a second-order cycle 112 and a third-order cycle 114. The base cycle is provided with 16 sectors 116 each of which represents slots or steps. The steps numbered 84 1 to 10 are grouped within the circumferential arc 118, each of which steps being used for subscriber connections. Steps 14 and 15 are used for release signals, and the remaining steps 11 through 13 and 0 are used for synchronism and controls, grouped within the arcuate portion 120.

The second-order cycle 112 singles out the direction from which controls arrive; namely from the exchange to the subscriber unit during the distribution phase 122, that is, the called subscriber connection and release; and from the subscriber unit to the exchange unit during the scanning phase 124, for the calling subscriber connection.

It will be noted that the cycle frequency for the first-order cycle is 150 cycles per second; for the second first-order cycle is 150 cycles per second; for the second-order cycle is 75 cycles per second; whereas for the third-order cycle is 18.75 cycles per second.

The third-order cycle 114 establishes on which of the three links 126 the operations must be performed. The third-order cycle 114 has a fourth phase 128 for warning purposes and further synchronism and control.

Figure 5:
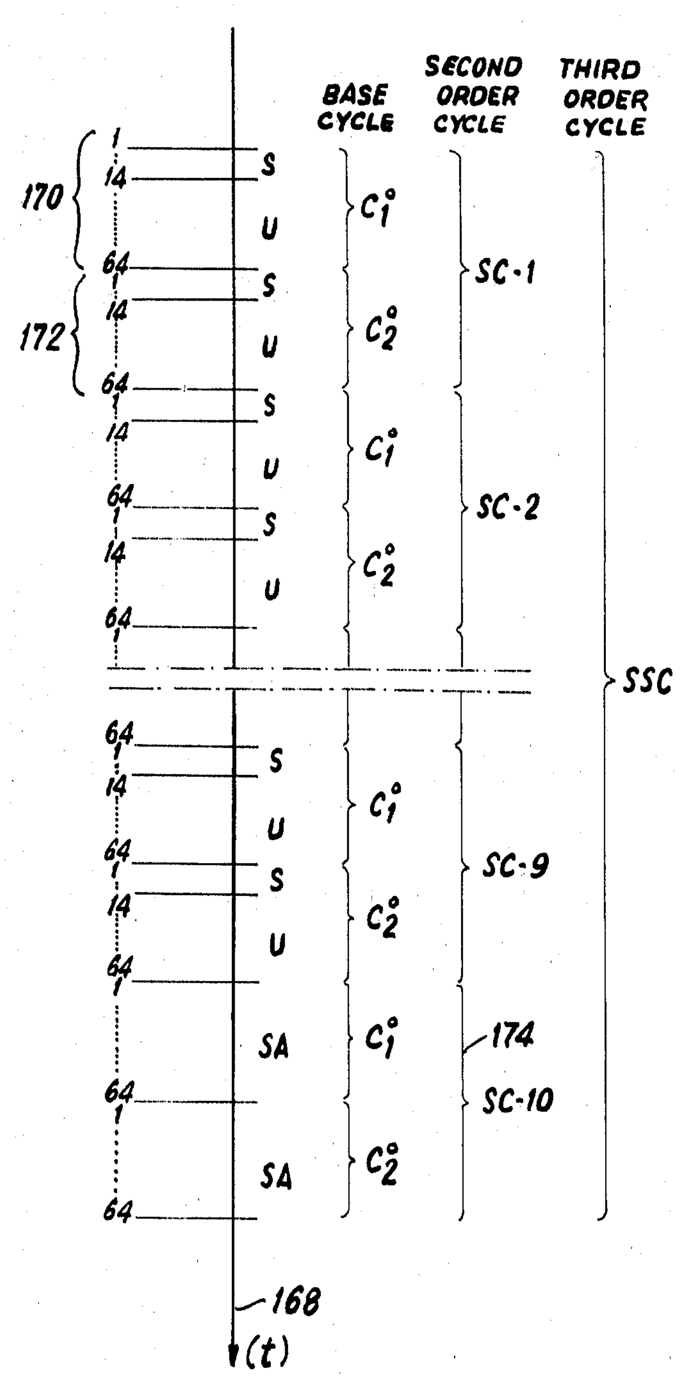
FIG. 5 is a chart as a function of time showing the correlated cycles of the line concentrator.

Referring now to FIG. 5, the block diagram illustrates the preferred embodiment of the invention which provides for 50 subscribers and nine links, simplified to the extent of showing only the first and last of 50 subscribers 130, the traffic for which being concentrated on nine links 132.

The line concentrator consists of exchange unit (UC) 134 physically located in the exchange (C) 136, to which are connected 50 subscriber's lines (L–1...L–50). The line concentrator further comprises a subscriber unit (UR) 138 located near the subscriber to which the subscriber's sets (U–1 through U–50), 130...140 are connected to the subunit through the lines (LL–1 and LL–50), 142...144. The two units 138 and 134 are connected through nine links 132 (*G*–1—*G*–9) and the service link (SL) 146 on which data concerning the line concentrator operations are exchanged by means of two receiver transmitters, (RT), 148 and (RT') 150. In both units 134 and 138 it is possible to distinguish a space division electromechanical switching matrix, (MDS) 152 and (MDS') 154 respectively, and a time division correlated cycles electronic control circuit, (CDTCC) 156 and (CDTCC') 158 respectively.

The subscriber unit control circuit 158 operates according to the state of its own matrix 154, according to the data concerning the state of the subscriber which arrives through the matrix wires (CC–1—CC–50) 160, 162 connecting units 154 and 158, and also according to the data exchanged through the receiver transmitters 150 and 148 over service link 146. The exchange unit control circuit 156 operates according to the state of its matrix 152, according to the data concerning the state of the subscriber which arrives through the control wires (C–1—C–50), 164, 166 connected to the subscriber terminations in the exchange 136, and according to the data exchange through the receiver transmitter 148, 150 and the service link 146.

Referring now to FIG. 5 there is shown a chart to illustrate the correlated cycles organization (CCO) as applied to the line concentrator control circuit of the invention now being described. The time reference line (*t*) 168 extends in a vertical direction, the time sequence increasing downwardly. The time bar 168 is divided into a plurality of slots or steps. The base cycles $C^{\circ}_1$ and $C^{\circ}_2$ consist of 64 steps each as indicated, for example, by the first portion 170 and 172. To any two base cycles correspond a second-order cycle. Ten second-order cycles (SC–1...SC–10) make up a single third-order cycle (SSC), the third-order cycles (SSC) repeating themselves in sequence.

The 64 base cycle steps are divided into 14 steps, S, where control, synchronization and release portions are carried out, and into 50 steps (U) allotted to the single subscribers where the connection operations of the subscribers are carried out.

A second-order cycle (SC) consists of two base cycles. Each second-order cycle singles out or selects one link. Within each second-order cycle the first base cycle $C^{\circ}_1$ is used for the connection of the calling subscribers to the link relative to the second-order cycle while the second base cycle $C^{\circ}_2$ is used for the connection of the called subscribers to the very same link. To the first nine second-order cycles (SC–1 through SC–9) are allotted the nine line connecting links 132 (*g*–1 through *G*–9) while during the last second-order cycle 174 (SC–10) supervision and warning operations (SA) are carried out.

It will be apparent thus that according to such an arrangement of the organization illustrated as the preferred embodiment of this invention, a pulse signal appearing, for example, during step number 15 of the step group U of the first base cycle $C^{\circ}_1$ of the fifth second-order cycle (SC–5) indicates the connection of the calling subscriber 15 to link 5.

Furthermore, it will be understood this information or data can appear again or be repeated only after a third-order cycle.

Figures 4, 7:
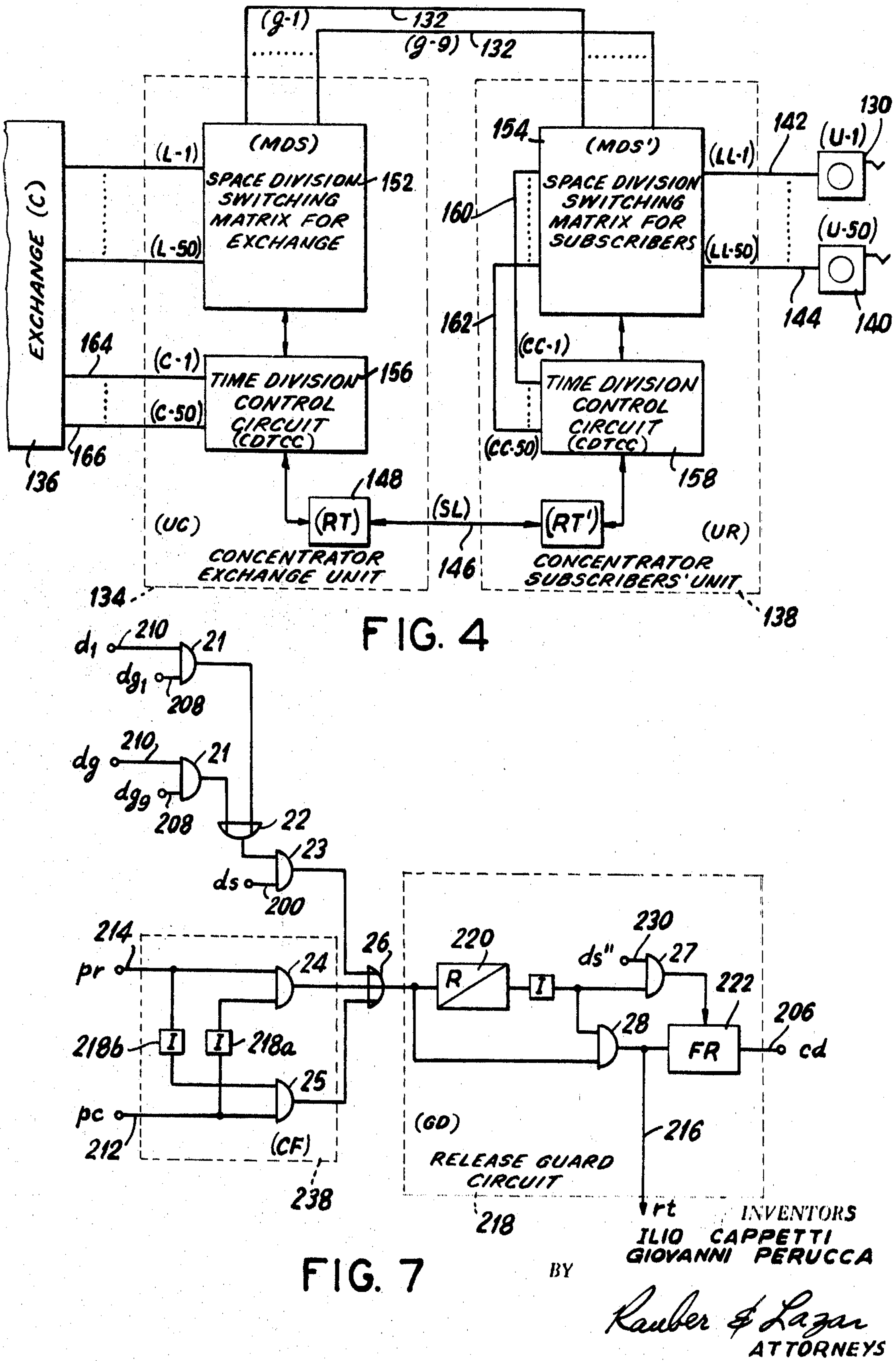
FIG. 4 is a block schematic of a line concentrator system embodiment of the invention.
FIG. 7 is a block schematic in greater detail of the link supervision and release circuit of an exchange unit shown in the general block diagram form in FIG. 6 as "SDG."
Figure 6:
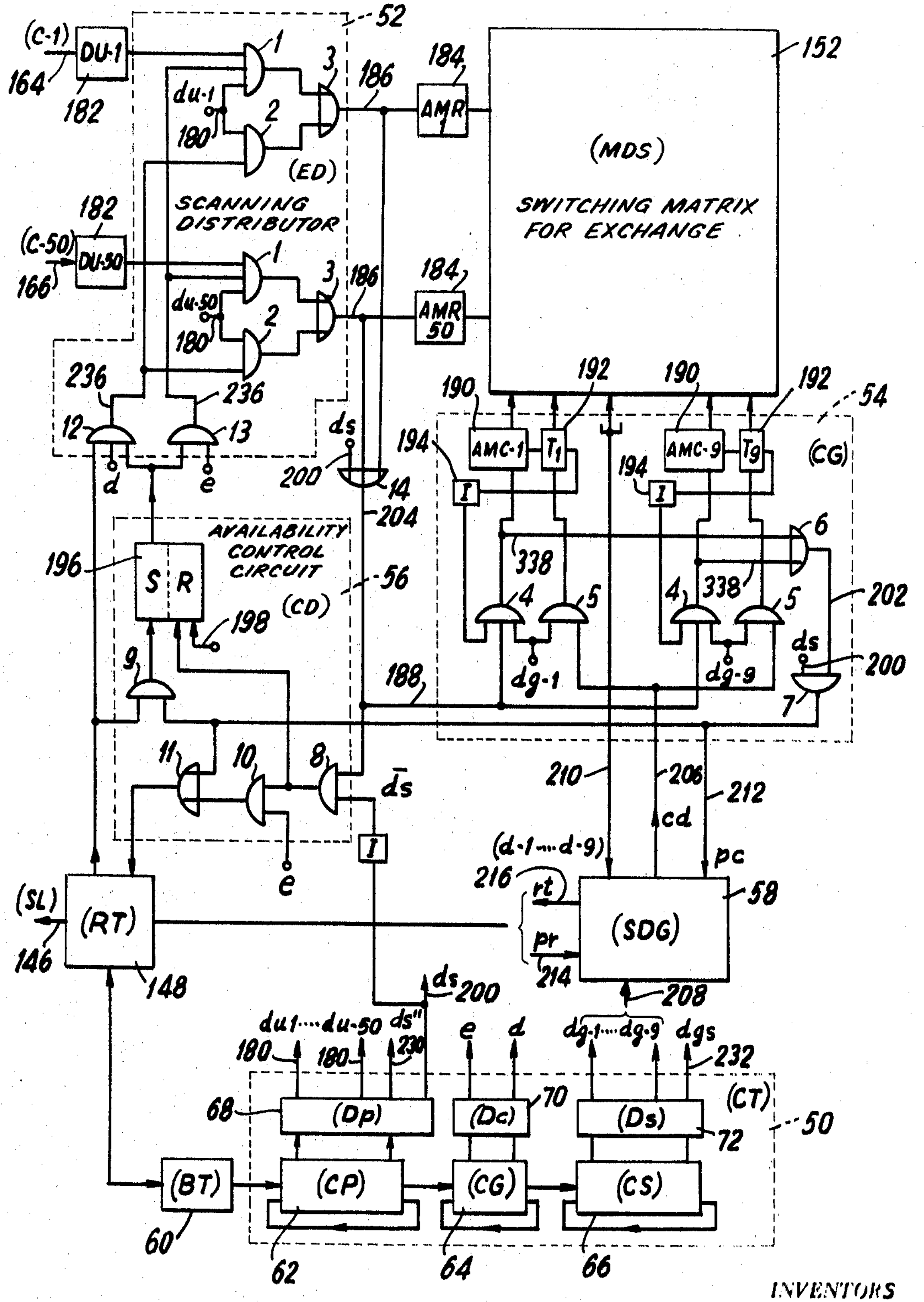
FIG. 6 is a logical diagram in block schematic form of the line concentrator exchange unit arranged according to the chart illustrated in FIG. 5.

Referring now to FIG. 6, there is shown in block diagram form a more detailed illustration of one embodiment of the invention illustrating the line concentrator logical circuits arranged to perform as heretofore described, noting in particular that the time sequence chart of FIG. 5 is the basis of the operation of the system illustrated in FIG. 6, as well as FIG. 7.

FIG. 6 particularly is arranged in component designation only in respect to the line concentrator exchange unit, 134 (UC) of FIG. 4. It is believed unnecessary to provide generally any additional illustrations of the similar components for the subscriber unit 138 (FIG. 4).

It will be understood, however, that the subscriber unit 138 has the same logical organization as the exchange unit 134 (FIG. 6), noting that the only difference between the two units is in respect of the link-supervision and release circuit which in the subscriber unit has only a redundancy filter. Also, in respect of the subscriber circuits 182 (DU–1 through DU–50) in the exchange unit which receives call signals respectively over the control wires 164, 166 (C–1 through C–50), while in the subscriber unit such call signals are received from the subscriber's lines through the matrix 154 (MDS') of FIG. 4.

The exchange unit circuits of the line concentrator referring now to FIG. 6, can be subdivided or arranged into the following main sections: the counter section 50 (CT), the scanner distributor 52 (ED); the space division electromechanical matrix 152 (MDS), also included in part in FIG. 4; the link control circuit 54 (CG); the availability control circuit 56 (CD); the link-supervision and release circuit 58 (SDG), expanded in more detail in FIG. 7; and the receiver transmitter 148 (RT), previously described to with respect to FIG. 4.

The (CT) counter 50 functions to single out the different steps, cycles and second and third-order cycles. This counter is under control of the clock 60 (BT), synchronized through the receiver transmitter 148 with the corresponding clock of the subscriber unit (not shown). The clock activates the step-ring counter 62 (CP) having 64 steps. Each cycle or counter rotation of the ring counter 62 activates the two-steps cycle ring counter 64 (CC). Each cycle of the counter 64 activates the second-order cycle ring counter 66 (CS). The 64 steps of counter 62 are decoded through the decoder 68 (D*P*) into 50 outputs 180 (*du*–1 through *du*–50) each of which outputs is allotted as above described to one subscriber.

Further the 14 remaining outputs are used for control synchronization and release operation, among which, outputs *ds* (200) and *ds''* (230) are produced by decoder 68.

The two steps of counter 64 are decoded through decoder 70 (D*c*) into two outputs *e* and *d* which discriminate the two cycles of each second-order cycle and indicate if the subscriber to be connected is a calling subscriber or a called subscriber. The ten steps of the counter 66 are decoded through decoder 72 (D*s*) into the nine outputs (*dg*–1 through *dg*–9) allotted as we have previously indicated to the nine links 132 (FIG. 4). The decoder 72 also develops the output signal *dgs* over lead 232 allotted to supervision and warning operations.

The scanning distributor (ED) 52 consists of 50 subscriber networks comprising two AND gates 1, 2 and an OR gate 3. Each subscriber network corresponding to a subscriber and to a matrix row of MDS is activated by the corresponding signal (*du*–*kP*) 68 in the time slot allotted to the same subscriber.

The operation of the scanning distributor 52 is controlled by the two AND gates 12 and 13. The gate 13 controls all AND gates 1 of the subscriber networks over conductor 234 and gate 12 controls all AND gates 2 over conductor 236. When gate 13 is active the ED scanner 52 has the function of a scanner. Thus if a subscriber device (DU–K) 182 signals for a connection the call signal appears through the relative AND gate 1 in the time slot, determined by the signal (*du*–*k*) 180, at the output of the subscriber network.

When the gate 12 is active the circuit 52 functions as a distributor. Thus a call signal of a certain subscriber, transmitted through the receiver transmitter (RT) 148 is passed through to the gate 12 and gate 2 of the subscriber's network to the output of the subscriber's network, the gate 2 at that moment being activated by the corresponding signal (*du*–*k*) 180.

The respective distributor scanner units (ED) of the two units operate in alternating synchronism. In the first cycle of each second-order cycle, the corresponding ED unit of the subscriber has the function of a scanner and the ED circuit 52 of the exchange unit has the function of a distributor. Thus call signals coming from the subscriber unit are made, such being understood to be also described as "calling subscriber connections."

In the second cycle of each second-order cycle the ED circuit change its function and the called subscriber connections are made. The signals which appear at the output of the subscriber networks activate, through the memory amplifiers 184 (AMR–1 through AMR–50), the respective matrix rows of MDS. The memory amplifiers 184 function to amplify the signals received from logic circuits and to store them for a period of time sufficient for the operation of electromechanical components, such as relays.

The output signals from the subscriber networks are passed over conductors 186 to the OR gate 14 to control, in parallel, the AND gates 4 of the link control circuit 54 over conductor 188. These signals operate or energize only the gate which at that moment is activated by signal (*dg*–*k*) which identifies one of the nine links 132. Such signals also are passed through the gates 4 to memory amplifiers 190 (AMC–1 through AMC–9). The memory amplifiers 190 activate the corresponding holding circuit 192 (T–1 through T–9).

The row and column amplifiers 184 and 190, so selected, single out and operate a matrix relay, not shown, the relay being held by the holding circuit 192 of the corresponding column.

When one of the holding circuits (T–k) is activated, an inverter 194, connected between its corresponding holding circuit 192 and gate 4, inhibits the corresponding gate 4 preventing thereby the execution of other instructions in that column.

The availability control circuit 56 (CD) functions to inhibit the scanning and distribution of call signals when a link is busy or during the period a link connection operation is being carried out. Through this circuit (56), the cycles sequence of the line concentrator does not depend upon the fact that the links are free (idle) or busy, if a link is busy, however, the order cycle allotted to that link occurs, but during it, all connection operations are inhibited. The availability control circuit (CD) 56 consists essentially of a flip-flop 196 comprising the set portion S and the reset portion R. In the set position (S) flip-flop 196 activates gates 12 and 13 while in the reset position (R) it inhibits connection operations. At the beginning of each second-order cycle the flip-flop 196 resets after having received the signal *r* over lead 198, generated by the clock 60. Thereafter a special signal (*ds*) among those having control functions and generated during a step of the counter 62, is passed to gate 14 over conductor 200. This (*ds*) signal functions to check if the link marked at that movement by the link decoder 72 is busy. The (*ds*) signal is carried over the same path of the normal connection signals and appears at the input of all gates 4 (link control circuit 52) as well as the input of the particular gate 4 which is activated at that movement by the link decoder 72.

If the corresponding link is free and the gate 4 is not inhibited by its inverter 194, the *ds* signal is received by the OR gate 6 over its associated conductor 338. The *ds* signal controls also the column memory amplifier 190 but does not operate any matrix relay since no instructions can reach the row amplifiers 184 during the step producing the (*ds*) signal from the decoder 68. The check signal putout from gate 6 is passed through gate 7 over conductor 202, gate 7 being activated only by the (*ds*) signal.

Gate 9 compares the check signal to the result of the corresponding checking made in the other unit transmitting through the RT unit 148. Only if in both units the link is indicated to be free will the gate 9 be activated and its output set in the flip-flop 196 which in turn activates the scanning distributor circuit 52 as described above.

The result of the link checking is also passed through the gate 11 and the receiver transmitter 148 to the control circuit 56 of the subscriber unit in which a similar operation is performed.

As described above, the circuit 56 inhibits the connection operations not only when a link is busy but also while a link connection operation is being carried out. Thus, the availability control circuit 56 prevents the arrival of two consecutive connections instructions on the same link.

The output of gate 14 is carried over conductor 204 to the input of gate 8, then the flip-flop 196 to reset it, preventing all possible operations on the same link. It is to be noted that gate 8 is inhibited during the link state check by the *ds* signal.

The output of gate 8, produced during the scanning phase, must be transmitted to the other (subscriber) unit 138 as well. This is accomplished by the AND gate 10 which is activated during the scanning phase over conductor *e* (produced by decoder 70), and whose output is connected with the receiver transmitter (RT) through the OR gate 11.

The output of each of the gates 5 of the link control circuit 54 is connected to the holding circuits 192 for release operation thereof in response to the signal (*cd*) over lead 206 generated by the link supervision and release circuit 58 (SDG).

The function of circuit 58 is to carry out the self-correction of the conductor link availability state by transmitting the release instructions (*cd*) when a subscriber hangs up or, when, because of noises, irregular connection operations may have been made. SDG circuit 58 receives signals (*dg*–1 through *dg*–9) over their respective conductors 208 from the decoder 72 with respect to each link that has to be tested. Also circuit 58 receives signals, (*d*–1 through *d*–9) over respective conductor leads 210 from matrix 152 respectively, of the state of conversation of the various links, that is, whether or not a conversation is occurring over any link or not. In addition the circuit 58 receives a signal (*pc*) over conductor 212 which is received from the local link circuit 54 and is generated during the time slot producing signal (*ds*), concerning the availability state of the link under test. Finally circuit 58 receives a (*pr*) signal over conductor 214 from the subscriber unit via the (RT) circuit 148, 150, representative of the availability state of the same link in the subscriber unit. The (RT) signal over conductor 216 is a release signal generated by the circuit 58 and is transmitted to the corresponding circuit in the subscriber unit over the (RT) path as previously indicated.

The release instruction (*cd*) also is produced by circuit 58 and will be explained with reference to the description of FIG. 7, to which reference is now made.

When a subscriber terminates a conversation on a particular link (*k*), the release signal (*d–k*) appears over conductor 210 at the output of the corresponding AND gate 21, on the input of which at the same time the identification signal of the link (D*g–k*only in the time slot corresponding to its own link.

The outputs of the gates 21 are assembled in the OR gate 22 and pass through the AND gate 23 only during a proper time slot, being singled out by the (*ds*) signal activating the gate 23 over conductor 200.

The (*pr*) and (*pc*) signals are carried to a reference circuit 238 (CF) over conductors 214 and 216 respectively. The circuit arrangement of the AND gates 24 and 25 and of the respective inverters 218*a* and 218*b* produces an output signal from gates 24 and 25 each time a difference is detected in the availability state of a same set of links in the two units. Therefore, it should be noted that gate 23 will produced an output release signal which is produced at the end of a conversation while at the output of the gates 24 and 25 there will be developed a release signal for self-correction. These release signals suppress certain wrong operations. Such incorrect operations may occur because of noise or error; a connection instruction has not been carried out by both units; or improper operations which have been carried out on different links in both units. These release signals will repeatedly reappear in the concentrator automatically until they are carried out correctly.

All release signals are carried to the OR gate 26 and are conducted into the guard circuit 218 (GD) to guard against any improper release.

The function of the wrong release circuit 218 is to carry out a release operation only if the corresponding signal appears for a certain number (*n*) of subsequent third-order cycles. The release operation requires this additional control, because, while the wrong execution of a connection instruction is being corrected, as just described, a wrong release operation causes the release of the exchange devices and, therefore, cannot be corrected anyhow.

It should be observed, incidentally, that the subscriber will perceive a short delay in receiving a desired line during any of these correction operations.

The guard circuit 218 consists of a delay element 220 (R), for example, a one-shot multivibrator, which after each release signal functions to inhibit gates 27 and 28 for a period corresponding exactly to a third-order cycle. This circuit has the function to permit, in case of many simultaneous release requests for the various links, for a one-at-a-time processing of such requests.

If it is assumed, for example, that a release signal for link number 5 appears on the output of gate 26, immediately thereafter gates 27 and 28 are inhibited and maintain this state for the time assigned to the other links. Gates 27 and 28 will thereafter become activated again until after an entire third-order cycle has been completed, that is, when the time slot assigned to link number 5 reappears. Thus, the subsequent release signals (*rt*) relative to a single link will appear on the output of gate 28 over lead 216 as described above.

The wrong release circuit 218 also includes a redundancy circuit filter (FR) 222 which may comprise, for example, a counter or integrator followed by a threshold element of any known design. The filter detects the subsequent ($n$) release signals and originates over conductors 206 the ($cd$signal for the release instructions. If after a certain number of consecutive release signals whereby ($tp$) is smaller than ($n$), the next $p$ 1 signal does not appear, this will mean that the delay element 220 is not activated, gate 27 is not inhibited and the control signal ($ds''$over lead 230, following the ($ds$) signal over lead 200, causes, through gate 27, the reset of filter 222, so that the counting of ($N$) consecutive release signals starts again from 0.

The ($n$) release signals are sent over conductor 216 to the (RT) unit 148 to the corresponding (RT) unit 150 in the subscriber unit where the signals are received by a corresponding redundancy circuit filter corresponding to filter 222.

It should now be appreciated that in accordance with the invention the noise protection is performed by the logical organization; by the interface present on the data transmission links; by simple resistance and capacitance filters at the control wires of the electromechanical exchange; and by the earth and supply division of disturbing and disturbed circuits. Thus, it should be especially noted, this noise protection is accomplished without any separated conductors which may be liable to noise nor to any special shielding provisions for such conductors.

It has been determined by actual tests that noises do not cause operational failures in systems arranged according to this invention, since such noises are suppressed at a logical stage. Furthermore, noise did not either hinder the connection operations as, for example, by making control signals, as the time coherence of said signals (cyclical repetition of control instructions) provided for the proper operation on a subsequent cycle. Also the presence of eventual troubles or failures among different elements of both such matrices 152 and 154 cannot hinder the proper operation of the concentrator since the same control instructions were repeated in a subsequent second-order cycle which is used it should now be appreciated, for the execution of other components or elements performing the same switching function.

The release operation features a special self-correction function easily attainable with the correlated cycle organization (CCO) of the invention. The release is carried out, it will be noted, only if the relative instruction is repeated at least three or four times.

A similar mode of operation is applied on the concentrator with regard to warnings. Thus, if an operation is not carried out, such an operation will be repeated automatically in each cycle. However, it should be noted if the repetition lasts for a certain number or cycles, the warning signal will be sent.

It will be appreciated that the general objectives described earlier have been achieved and the manner of carrying them out has been described in detail. It is a particular advantage of the invention, as noted above, that there is provided by the correlated cycles logical organization of this invention a division peripheral switching system that occupies relatively small space.

It will now be appreciated that the invention is the time division correlated cycles organization of control circuits in the line concentrator of a type of TDM (time division multiplex) organization characterized by the particular way in which the various operations are associated to the various time phases. This organization utilizes a chain of three ring counters in series. The first counter identifies the subscriber to be connected or disconnected and the kind of operation it performs (connection, disconnection, synchronization); the second counter identifies which of two ways a telephone connection can be viz.

a. a subscriber calling (call originated in the subscriber unit), or
b. a subscriber being called (call originated in the exchange unit); and the third counter identifies the link to be connected or disconnected.

It will be further appreciated by those skilled in this art that the advantages of the invention skilled in this art that the advantages of the invention concern especially the insensitivity to noises and makes possible, for electronic control circuits in genera, the use of the principles hereinabove described in respect to one embodiment for a large range of integrated logic circuits.

Thus, any system utilizing the transmission or exchange of signals may adopt the principle of this invention to provide for self-correction of errors, especially on noisy circuits.

Accordingly it will be appreciated by those skilled in the art that this invention is not limited or restricted to the embodiment described herein, but, to the contrary, many arrangements and modifications can be made within the limits of the invention as defined by the appended claims.

What we claim is:

1. A line concentrator for connecting a plurality of subscriber lines to a central office through a lesser number of links characterized by:

a. means for generating signals at a frequency representing a base cycle for scanning all of said lines;
b. means for generating a second-order cycle whose frequency is a submultiple of said base frequency for scanning said links;
c. a subscriber unit connected to said plurality of subscriber lines;
d. an exchange unit connected to said central office; and
e. means included in each of said units being responsive to said base cycle means for establishing a connection between said subscriber unit and said exchange unit through said links.

2. A line concentrator according to claim 1 including means for the continuous supervision of different operation conditions, means for the automatic correction of wrong connections, and means for generating a cyclical repetition of control instructions, said cyclical repetition means including means for discriminating between instructions and noise.

3. A line concentrator according to claim 1 characterized in that the subscriber unit includes a cross-point matrix for connecting the subscriber lines to the links and the exchange unit includes a cross-point matrix for connecting the links to the central office, said matrices being symmetrical and controlled by logic control circuit means, said logic control circuit means including corresponding circuits in the subscriber and exchange units and exchanging control and synchronization data through a single auxiliary transmission link.

4. A line concentrator according to claim 3 characterized in that said logic control circuit means comprise, a. a step ring counter counting steps in the base cycle, said counter allotting a time slot in said base cycle for each of a plurality of operations, such operations including the connection of a subscriber to a link, the disconnection of a link, and the synchronization between the subscriber and exchange units;
b. a cycle ring counter for counting base cycles of said step counter and distinguishing them alternately in scanning cycles and distribution cycles;
c. a. second-order ring counter counting cycles of said cycle counter and allotting each couple of said base cycles to a link; and
d. means for synchronizing the steps of each of said ring counters whereby the step counter and the second-order counter in the subscriber unit are in phase with the corresponding counters in the exchange unit while the cycle counter in the subscriber unit is in phase opposition to the cycle counter in the exchange unit.

5. A line concentrator according to claim 4 characterized in that said subscriber and exchange unit comprise a scanner distributor circuit for detecting and distributing call signals, the operation of said scanner-distributor circuit being controlled by the step counter, the cycle counter and the second order counter in such a way that the step counter defines the subscriber to be connected, the second-order counter defines the link to be connected, the cycle counter defines whether the scanner distributor circuit is operating as a scanner or as a distributor, said scanner distributor circuit including means for detecting, during its operation as a scanner, call signals corresponding to the subscribers singled out successively by said step ring counter and including means for activating in the cross-point matrix the row control circuit corresponding to said subscribers if a call signal is detected, said scanner distributor circuit including means for activating during its operation as a distributor the row control circuit in the cross-point matrix corresponding to the subscribers singled out successively by said step ring counter if the receiver on the auxiliary transmission link detects a call signal from the other unit, said line concentrator further including means responsive to call signals activating the row control circuits for activating with the same signals the column control circuits in the cross-point matrices corresponding to the links singled out by the second-order ring counters, said line concentrator further including means responsive for sending said call signals over said auxiliary transmission link.

6. A line concentrator according to claim 5 characterized in that every said column control circuit comprises a column relays holding circuit; said holding circuit including means for hindering when activated further call signals through said column control circuit.

7. A line concentrator according to claim 6 characterized in that the availability state of each link in the exchange and subscriber units is stored during the corresponding second order cycle in a storage element activating said scanner distributor circuit to send a possible call signal; said storage element being set to a nonavailability state by a signal corresponding to the initiation of each second order cycle said nonavailability state of the storage element remaining until a control signal, generated under control of the step ring counter, enters said column control circuit whereby, if said column relays holding circuit is not activated, a signal of availability will be developed which is transmitted to the input of said storage element to change its state.

8. A line concentrator according to claim 7 including in said exchange unit a link supervision and release circuit controlled by said step ring counter and said second order ring counter responsive to the real state of the busy links; said link supervision and release circuit sending a release signal in a time slot defined by the step ring counter if the link singled out at that time by the second order ring counter has been released, said generated release signals arriving at a guard circuit included in the link supervision and release circuit, said guard circuit sending a release instruction to the column relays holding circuit after a count of a fixed number of release signals associated to the same link has been received, said line concentrator further including means for sending said release instruction to the subscriber unit.

9. A line concentrator according to claim 8 characterized by a reference circuit included in said link and supervision release circuit, said reference circuit including means for receiving at a first input signals coming from a subscriber unit and indicating the availability state of said links in said matrix and at a second input signals coming from the local link control circuit indicating the link availability state in the corresponding matrix, said reference circuit comparing said signals and if there is a difference sending a release signal to the guard circuit.